United States Patent [19]

Davis et al.

[11] 4,174,427

[45] Nov. 13, 1979

[54] METHOD OF MAKING EXPANDABLE POLYSTYRENE BEADS

[75] Inventors: Pauls Davis, Gibraltar, Mich.; Herbert H. Gahmig, Bad Dürkheim, Fed. Rep. of Germany; Irving R. Schmolka, Grosse Ile, Mich.

[73] Assignee: BASF Wyandotte Corporation, Wyandotte, Mich.

[21] Appl. No.: 927,175

[22] Filed: Jul. 21, 1978

[51] Int. Cl.² ............................................... C08J 9/22
[52] U.S. Cl. .................................... 521/56; 521/57; 521/88; 521/905; 521/911; 521/918; 528/494
[58] Field of Search ............... 528/494; 521/905, 911, 521/918, 56, 57, 88

[56] References Cited

U.S. PATENT DOCUMENTS

| | | | |
|---|---|---|---|
| 3,001,954 | 9/1961 | Buchholtz et al. | 521/56 |
| 3,468,820 | 9/1969 | Buchholtz et al. | 521/56 |

*Primary Examiner*—Morton Foelak
*Attorney, Agent, or Firm*—John W. Linkhauer; Joseph D. Michaels; Robert E. Dunn

[57] ABSTRACT

Expandable-polystyrene beads suitable for use in making impervious containers are made from a recipe including styrene, free-radical initiator and polyvinyl pyrrolidone, and this practice includes a step of washing the beads in a warm aqueous solution to which an alkoxylated nonionic surfactant having 70-90 percent of its molecular weight accounted for by oxyethylene units is added in an amount effective to cause the washing to remove contaminating grafted polyvinyl pyrrolidone from the surface of the beads and cause them to become expandable into impervious product containers.

2 Claims, No Drawings

METHOD OF MAKING EXPANDABLE POLYSTYRENE BEADS

BACKGROUND OF THE INVENTION

1. Field of the Invention

This invention relates to making beads of expandable polystyrene, in particular to the making of beads destined for use in making containers such as drinking cups. More particularly, it relates to a washing procedure which seems to overcome mold-filling and static problems.

2. Description of the Prior Art

It may be taken as known that styrene monomer may be polymerized together with a free-radical initiator and water and polyvinyl pyrrolidone and pentane to produce beads of expandable polystyrene containing a suitable proportion of pentane as blowing agent and having a desired particle size, such as one on the order of 0.4 to 0.6 millimeters. Those skilled in the art are familiar with the techniques required for obtaining a product having particles of the desired degree of polymerization and the desired size, adjusting such parameters as the nature and concentration of the free-radical initiator used, the time-temperature cycle employed, the severity of the agitation provided during the suspension-polymerization process, and the amount and the time of addition of the polyvinyl pyrrolidone. Although the practice, using polyvinyl pyrrolidone as one of the ingredients in the recipe, has proved satisfactory for the making of expandable-polystyrene beads which are used for insulation, there had not been known, prior to this invention, how such a recipe, using polyvinyl pyrrolidone, could be used to make an expandable-polystyrene bead product which would be suitable for use in the making of drinking cups or other impervious containers. Previous efforts to make expandable-polystyrene beads from such a recipe for such a use met with failure, in that too great a percentage of the product containers exhibited leaking. Moreover, the containers, after being formed, even if they did not exhibit leaking, exhibited undesirable static-electricity effects, tending to attract or to repel one another and making their handling difficult.

SUMMARY OF THE INVENTION

It has now been found that by washing the beads for a suitable period of time such as 3 to 10 hours, preferably about 5 hours, at a temperature of 40 to 55 degrees Centigrade, preferably about 50 degrees Centigrade, in an aqueous solution of a hydrophilic alkoxylated non-ionic surfactant which is solid at room temperature and has a molecular weight, 70–90 percent of which is accounted for by oxyethylene units, the surfactant being present in the aqueous solution in an amount effective to cause the washing to remove contaminating grafted polyvinyl pyrrolidone from the surfaces of the beads, the beads can be caused to become expandable into impervious product containers. Mold-filling and static-electricity problems are overcome or avoided.

DESCRIPTION OF THE PREFERRED EMBODIMENTS

The present invention may be explained by a discussion of an example of how it may be practiced, followed by a discussion of the possible modifications and equivalents thereof.

In one manner of practicing the present invention, beads of expandable-polystyrene of the appropriate particle size, such as 0.4 to 0.6 millimeter, are rather vigorously stirred together with an appropriate quantity of water to which there has been added a proper proportion of a non-ionic surfactant, as more particularly defined herein below. As one example, a batch of expandable-polystyrene beads weighing 1000 grams is mixed with 500 grams of water to which there has been added a quantity (0.01 percent by weight) of a nonionic surfactant known commercially as PLURONIC 25R8 surfactant. "PLURONIC 25R8" surfactant is a block copolymer based upon ethylene glycol, which is first oxyethylated to an extent such that the oxyethylene units account for approximately 80 percent of the total molecular weight, and then capped with oxypropylene units, the total average molecular weight being about 9000. In our experimental work, we used a sintered coarse glass funnel having a capacity of 3000 milliliters and mounted above a filter flask. A mechanical stirrer was provided. There was also provided a coil to which steam and/or cold water could be provided, in order to control the temperature of the mixture of beads and water.

After vigorous mixing at 55 degrees Centigrade for five hours, the washing was terminated, and a vacuum was applied to the filter flask to remove the wash water. Suction was continued for 60 minutes, in order to remove as much water as possible. Then, the beads were transferred to a container with a loose-fitting top and stored overnight at ambient temperature. Such beads are suitable for use in accordance with the present invention.

In our initial experimental work, data were collected concerning the results which are obtained when a procedure such as that indicated above is followed, using 1000 grams each of beads and water to which the surfactant had been added. The treated beads were subjected to extraction with methanol after a refluxing period of two hours to determine the weight of residue that could be obtained. When the above-indicated surfactant (PLURONIC 25R8) was tested, in comparison with various other surfactants and with the use of pure water, the results obtained were inconclusive. The untreated beads gave 25.2 milligrams of residue from a 50-gram sample; the treatment indicated above gave 15.0 milligrams; a treatment with pure water gave 13.2 milligrams, and various other treatments gave values ranging between 11.6 and 43.6 milligrams.

The beads were tested to determine the percentage of volatiles present. According to the available data, the untreated beads contained 6.0 percent of volatiles and beads treated in pure water contained 8.34 percent of volatiles. In this connection, it must be remembered that water is a volatile. Beads treated according to the procedure indicated above, exhibited 3.12 percent of volatiles. Those skilled in the art will understand that it is important to control the percentage of volatiles present in the product beads, because if it is too low, there is insufficient expansion, and if it is too high, there is a greater danger of unwanted porosity or permeability, or in other words, beads used to make drinking cups are likely to produce cups that leak. Those skilled in the art will understand that the temperature and duration of the washing treatment will have an influence of the percentage of volatiles in the finished beads.

In each case, the flow properties of the treated beads were observed, and beads treated in accordance with the procedure indicated above were free-flowing, whereas the untreated beads and the beads washed in water only tended to cake.

In each case, the quantity of wash water recovered was recorded, and values were observed that ranged from 781 grams for treatment in pure water to a high of 939 grams when a different surfactant was used. With the treatment indicated above, the quantity of wash water recovered was 892 grams.

The wash water was evaporated to dryness, and the weight of the residue was determined. In the case of the procedure indicated above, the residue weighed 1.2 grams, whereas in a treatment with pure water, the weight of the residue was 0.1 gram, and with other surfactants, values were observed ranging from 0.1 to 0.9.

In still another test, the treated beads were tested for dyeability with Erie Black 6400 dye (Color Index No. 30,325), and a qualitative judgment was made, based upon the color of the beads subjected to the dyeability test. Beads with unwanted residue remaining on the surface thereof can be expected to exhibit a grayish color. The beads treated with "PLURONIC 25R8" surfactant according to the procedure indicated above, retained substantially their original color. Beads treated with some of the other surfactants tried became grayish. Peculiarly, the untreated beads and beads washed in pure water also were not dyed. One reasonable interpretation of the results is that the other surfactants did a partial job of removing the initial dye-resistant surface, whereas the "PLURONIC 25R8" surfactant, which gave the highest value for residue in the wash water, removed not only the surface but also some sub-suface stratum that would make the beads susceptible to dyeing if it were not removed.

The invention is not considered as being limited to the use of 0.1 weight percent of "PLURONIC 25R8" surfactant.

The concentration of surfactant used may be varied between 0.001 percent and 1 percent.

Other nonionic surfactants may be used in place of the "PLURONIC 25R8" surfactant discussed above. The tests indicate that other suitable surfactants are ones which are solid at room temperature and contain oxyethylene units which account for 70–90 percent of their molecular weight. Those skilled in the art will appreciate that this includes any of a great number of commercially available nonionic alkoxylated surfactants with average molecular weight of about 5000 or more. Included are block copolymers based upon propylene glycol, which is first oxypropylated and then oxyethylated, as well as other nonionic surfactants which are based upon N,N,N',N'-tetrakis(2-hydroxypropyl)ethylenediamine.

While we have shown and described herein certain embodiments of our invention, we intend to cover as well any change or modification therein which may be made without departing from its spirit or scope.

We claim as our invention:

1. In making beads of expandable-polystyrene destined for container use from a recipe including styrene, free-radical initiator, and polyvinyl pyrrolidone, the improvement comprising washing the beads for about 3 to 10 hours at a temperature of about 40–55 degrees Centigrade in an aqueous solution of a hydrophilic alkoxylated nonionic surfactant which is solid at room temperature and has a molecular weight, 70–90 percent of which is accounted for by oxyethylene units, said surfactant being present in said aqueous solution in an amount between 0.001 and 1%, said amount being effective to cause said washing to remove contaminating grafted polyvinyl pyrrolidone from the surface of said beads and cause said beads to become expandable into impervious product containers.

2. An improvement as defined in claim 1, wherein said surfactant is a block copolymer based upon ethylene glycol, which is first oxyethylated to an extent such that the oxyethylene units account for approximately 80 percent of the total molecular weight, and then capped with oxypropylene units, the total average molecular weight being about 9000.

* * * * *